United States Patent
Mook

[15] 3,650,389
[45] Mar. 21, 1972

[54] DEVICE FOR THE STORAGE AND HANDLING OF PHOTOGRAPHIC FILM OR THE LIKE

[72] Inventor: Dan Gilbert Mook, Rochester, N.Y.
[73] Assignee: Eastman Kodak Company, Rochester, N.Y.
[22] Filed: Jan. 22, 1970
[21] Appl. No.: 5,039

[52] U.S. Cl.............................................206/53, 242/74.1
[51] Int. Cl........................................................B65h 75/28
[58] Field of Search..............206/53, 54, 55; 242/68.3, 74.1, 242/71.8 A, 74, 71.1, 74.2, 71.8

[56] References Cited

UNITED STATES PATENTS

| | | | |
|---|---|---|---|
| 1,685,010 | 9/1928 | Thornton | 242/71.1 |
| 2,765,908 | 10/1956 | Kulka | 206/54 |
| 1,840,926 | 1/1932 | Williams | 242/68.3 |
| 1,300,974 | 4/1919 | Johannsen | 206/54 |

Primary Examiner—George F. Mautz
Assistant Examiner—Gregory A. Walters
Attorney—Walter O. Hodson and Robert F. Crocker

[57] ABSTRACT

A device for the storage and handling of photographic film or the like including retaining means for holding the film securely to the device and release means for releasing the retainer means from its film-retaining position. In one embodiment the device may be in the form of a reel which includes retainer means for retaining the film on the reel and pivotable release means which may be actuated by positioning the reel on a spindle to pivot the retainer means from its film-retaining position to permit the film to be wound upon or unwound from the reel.

3 Claims, 5 Drawing Figures

DAN G. MOOK
INVENTOR.

BY

ATTORNEYS

Patented March 21, 1972
3,650,389
3 Sheets-Sheet 2
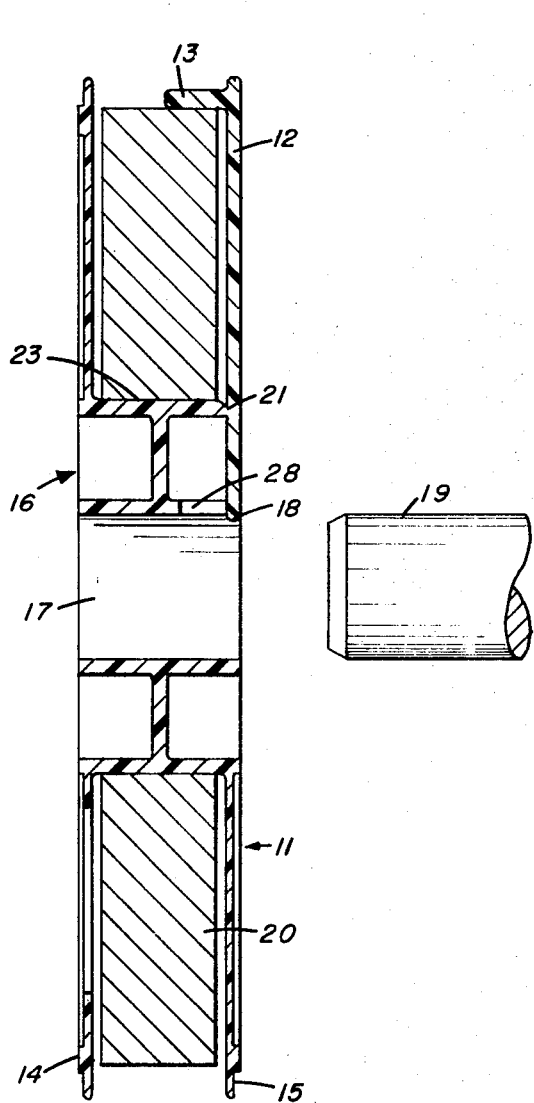
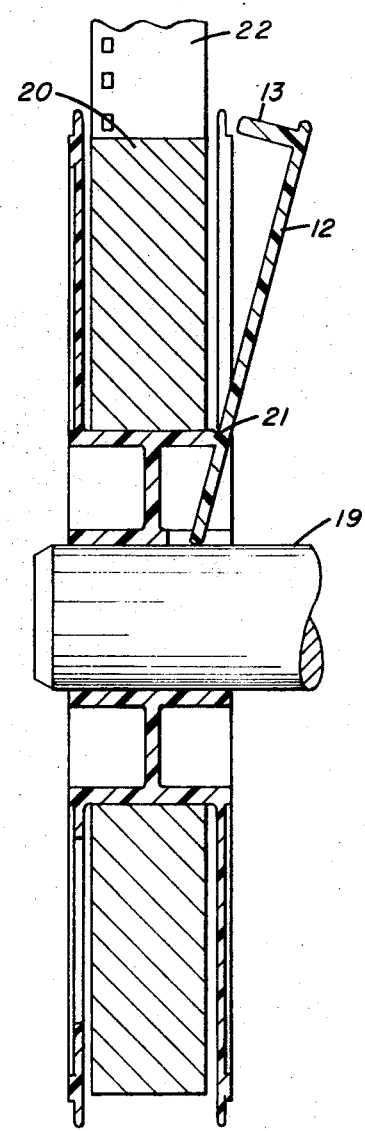
FIG. 2
FIG. 3
DAN G. MOOK
INVENTOR.
BY
ATTORNEYS Patented March 21, 1972

DAN G. MOOK
INVENTOR.

BY

ATTORNEYS 3,650,389

DEVICE FOR THE STORAGE AND HANDLING OF PHOTOGRAPHIC FILM OR THE LIKE

BACKGROUND OF THE INVENTION

This invention relates to the storage and handling of strips such as fibers, tapes, films, or the like which are commonly wound on spools or reels for storage. In the handling of these strips on reels, for example, there is the problem of preventing the unwinding of the products from the reel by the unraveling of the free end of the strip.

Various solutions to this problem have been proposed, such as the use of clips which are placed on the reel during storage or transportation of the reel and which are removed when the tape is to be used. An example of such a clip is disclosed by Kulka in U.S. Pat. No. 2,765,908. This type of retaining clip is manufactured separately from the reel and thus to a film processor, for example, additional costs will be incurred in returning processed film to a customer because of material and labor costs for the manufacture of these clips or alternatively for the purchase of these clips as well as additional labor costs required to place the clips on the processed reels.

These clips are also inconvenient to the customer since they must be removed from the reel when it is desired to view the processed film and be replaced after viewing the film.

It will therefore be appreciated that development of a device for the storage and handling of strips or the like from which the strip will not unravel when stored and which permits the strip to be wound upon or unwound from the device when desired without the necessity of removing clips therefrom represents a significant advance in the art.

SUMMARY OF THE INVENTION

It is accordingly an object of this invention to provide an improved device for the storage and handling of strips or the like which device includes retaining means for retaining the strips on the device and release means for releasing the retaining means to permit the strips to be wound upon or unwound from the device.

It is another object of this invention to provide an improved device for the storage and handling of strips or the like which device includes retaining means for preventing the strips from unraveling from the device and release means for releasing the retaining means from its strip-retaining position without separating the retaining means from the device.

It is a further object of this invention to provide an improved device for the storage and handling of strips or the like which device includes retaining means for preventing the strips on the device from unraveling when being stored and release means for releasing the retaining means from the strip-retaining position and which is responsive to the positioning of the device on a support for rotation of the device.

These and other objects are attained in accordance with my invention by providing a reel for the storage and handling of photographic film or the like, the reel including a hub having a surface upon which said film may be wound and an aperture adapted to receive a spindle, radially extending flanges at each end of said surface, a radially extending member having film-retaining means for the retaining of film to be placed upon the reel, the radially extending member being pivotably secured to the reel and the retaining means being biased toward a film-retaining position, the radially extending member further including spindle-responsive means adapted to be moved by the spindle when the spindle enters the hub to thereby cause pivoting of the radially extending member to release the film-retaining means from the film-retaining position.

BRIEF DESCRIPTION OF THE DRAWING

Further objects and advantages of the invention will be apparent from the following description taken in conjunction with the accompanying drawing.

FIG. 2 is a sectional view on the line 2—2 of FIG. 1, and showing film wound upon the outer surface of the hub.

FIG. 3 is a similar view to FIG. 2, but showing the spindle being received in the device.

DESCRIPTION OF THE PREFERRED EMBODIMENTS

Figure 1:
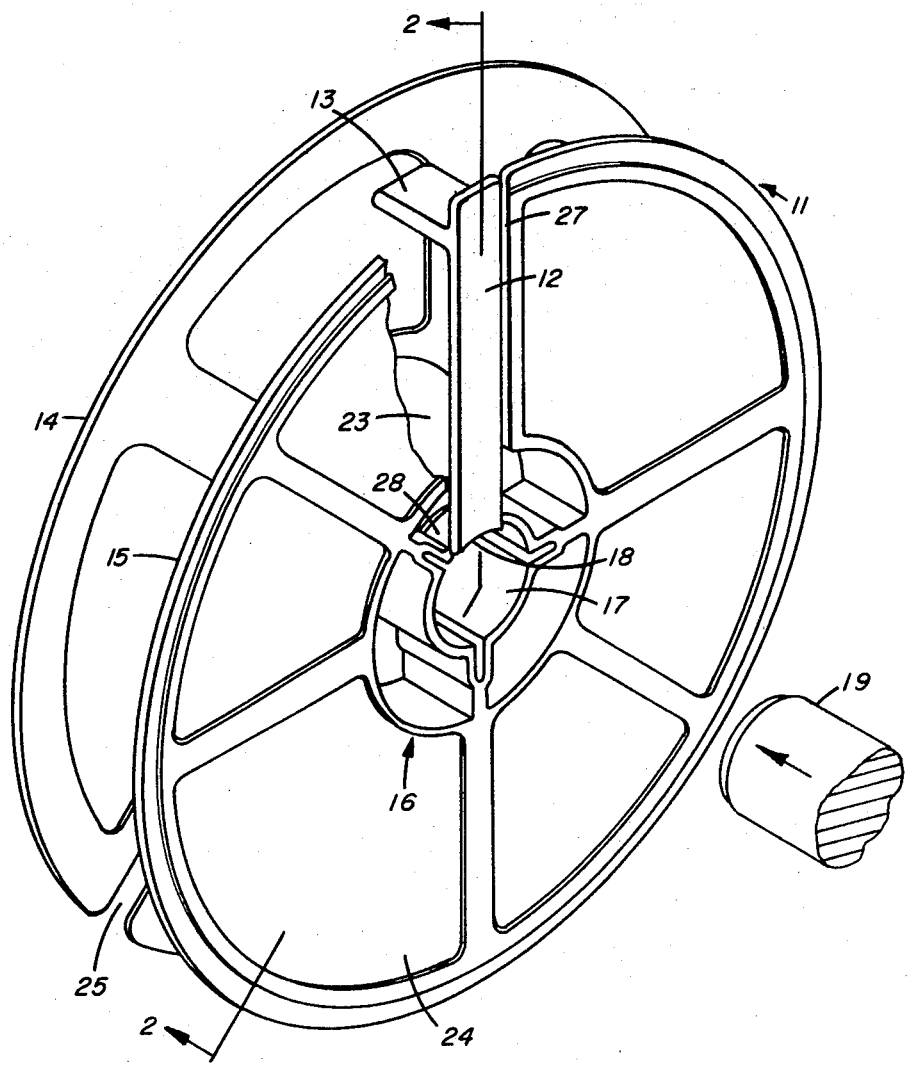
FIG. 1 is a perspective view partially cut away of one device embodying the present invention; the device is shown about to be positioned on a projector or windup spindle.

With reference to the drawing there is shown in FIGS. 1 through 3 a plastic reel 11 for storing photographic film having a hub 16 with an outer surface 23 upon which the film may be wound and hub 16 also including an aperture 17 for receiving a projector or windup spindle 19. At the ends of surface 23 there is immovably connected to hub 16 a pair of radially extending flanges 14, 15; one flange being shown with a plurality of thin webs 24 as in the conventional manner. Flange 14 is slotted at 25 to provide a slot for threading the film on the reel. Flange 15 is slotted at 27 to accommodate a radially extending member 12 which is integrally molded with reel 11 and is adjacent to outer surface 23. At approximately one end of member 12 there is disposed a film-retaining arm 13. As shown in FIG. 2, it will be appreciated that the reel will be produced so that the film-retaining arm 13 is adapted to be positioned over the wound film 20 and in contact therewith when in the film-retaining position. Radially extending member 12 includes a spindle-contacting portion 18 which protrudes slightly into the aperture 17 and is adapted to contact spindle 19 when the reel is placed on a projector or windup spindle. Hub 16 is slotted at 28 to permit pivoting of said member 12 in the direction illustrated. As shown in sequence in FIGS. 2 and 3, the reception of the spindle by the reel forces member 12 to pivot about the molded hinge 21 and thus releases the film-retaining arm 13 from its film-retaining position so that the film 20 may be played-out as shown at 22. The molded plastic hinge 21 acts as a spring to bias the radial member 12 toward the film-retaining position and thus when the spindle 19 is removed from the aperture 17 the radial member 12 automatically returns to the film-retaining position.

Figure 4:
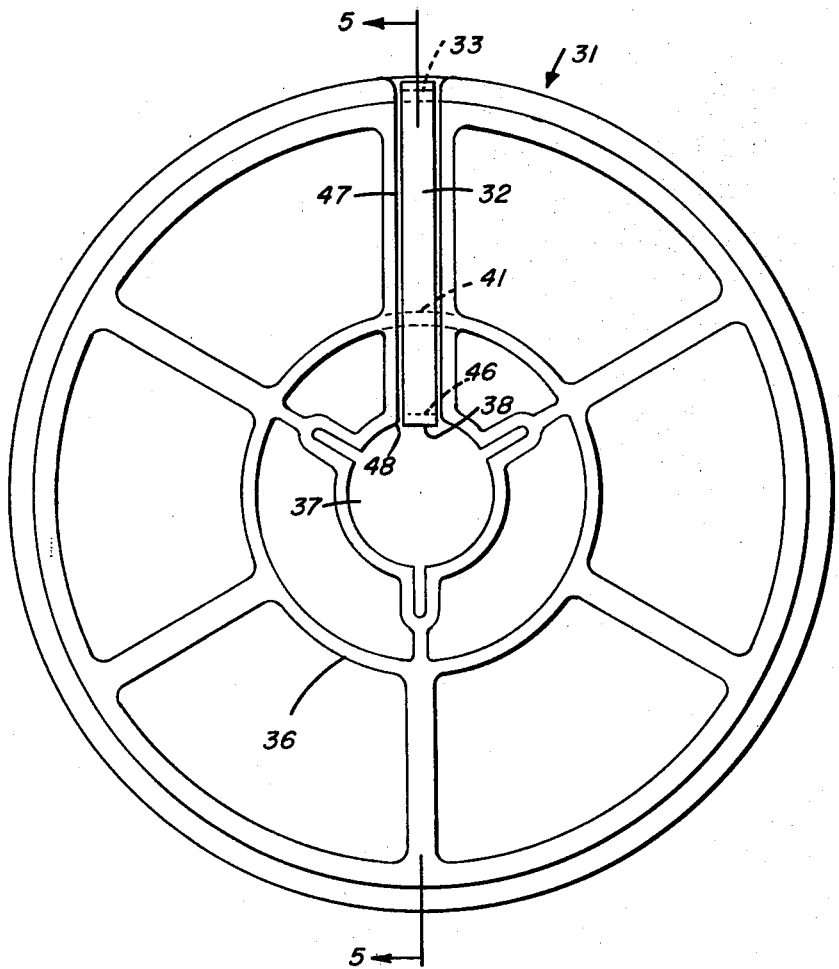
FIG. 4 is a face view of another device embodying the present invention.
Figure 5:
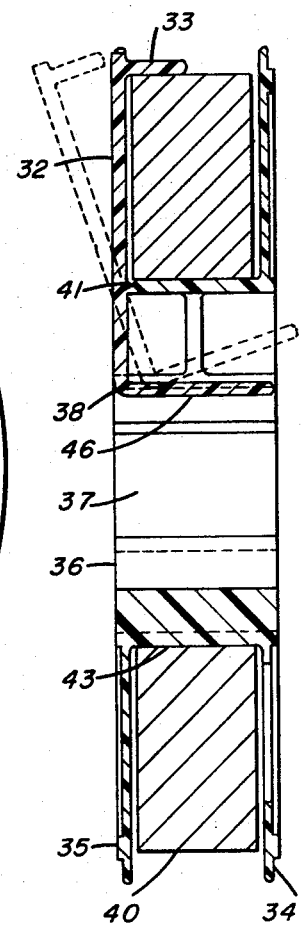
FIG. 5 is a sectional view on the line 5—5 of FIG. 4.

With regard to the embodiment shown in FIGS. 4 and 5, the reel 31 includes a hub 36 with an aperture 37 for receiving a spindle. The reel further includes an outer hub surface 43 upon which the film 40 may be wound. At the ends of outer hub surface 43 there is immovably connected to the hub a pair of flanges 34, 35 which are disposed in a conventional manner on reel 31. Flange 35 is slotted at 47 and in the slot there is positioned a radially extending member 32 which is pivotably secured to said reel at 41. The connection at 41 is shown as an integral molded hinge which permits molding of the entire reel in one molding operation. At about the outer radial end of member 32 there is a retaining arm 33 integrally molded on member 32 and adapted to be positioned over a wound roll of film 40 and in contact therewith to prevent unraveling of the film 40 from the reel 31.

The inner radial end of member 32 extends into aperture 37 and includes a spindle response portion 38 located within the aperture 37 and which is adapted to be pivoted by a spindle placed in aperture 37 to release member 32 from its film-retaining position. The pivoting will be in the direction as shown in sequence in FIG. 5.

The spindle response portion 38 of member 32 is shown in this embodiment to include an axially extending portion 46 which is integrally molded with the inner radial end of member 32. Hub 36 has a slot at 48 to permit the spindle response portion 38 to pivotably move within said slot when a spindle is inserted into aperture 37.

OPERATION

Since the embodiment shown in FIGS. 1 through 3 functions in a similar manner to the embodiment shown in FIGS. 4 through 5 the operation will be described with reference to the former embodiment only.

In use, film 20 is wound upon the reel by first placing the reel on a spindle or other support to be used to rotate the reel. As shown in FIGS. 2 and 3, the placement of the reel 11 on a spindle 19 causes the radially extending member 12 to respond to the spindle insertion and to thereby release the film-retaining arm 13 from its film-retaining position to permit the film to be wound upon the reel. When the spindle 19 is removed from the aperture 17 the springlike bias of the integral molded hinge 21 automatically returns the film-retaining arm 13 to the film-retaining position.

The particular means used in the preferred embodiments is similar to that of a cam-follower response. The spindle 19 functions as a cam when it is inserted into the aperture 17 as it contacts the portion 18 of member 12 and forces member 12 to pivot about hinge 21 in the manner shown.

Although the invention has been described with particular reference to photographic film, it will be appreciated that other materials such as fibers, tapes or other strips may be stored on devices incorporating the novel features of this invention. These novel features need not be in the form of reels but may also find utility on spools, bobbins, and other storage devices.

It will also be appreciated that a plurality of similar radially extending members 12 with retaining means 13 may be made on one storage device and these may be formed at intervals of any desired spacing around the storage surface.

Although it is preferred to have the hinge 11 molded integral with the reel, the member 12 may alternatively be pinned or riveted or attached to the reel in any other manner.

The device may have particular utility as a customer return reel for processed regular or super 8 movies or 16 mm. films. These films are after processing returned to the customer on reels having for each type of film a constant amount of film wound thereon. For each type of film a corresponding reel may be formed having a distance between the storage surface and the retaining arm be of sufficient length so that when the respective film is wound upon the reel the retaining arm will be just able to slip over the top outer surface of the wound film.

Thus, it is apparent that applicant has invented a device which eliminates the necessity for production or purchase of separate clips and also eliminates the step of assembling these clips to the precessed reels.

The invention has been described in detail with particular reference to preferred embodiments thereof, but it will be understood that variations and modifications can be effected within the spirit and scope of the invention.

I claim:

1. In a device for the storage and handling of strips or the like, the device comprising: 9 the axis of the hub, the securing means including a hub about which the strips may be wound in convoluted form, the hub having an aperture for receiving a spindle for supporting the device for rotation about an axis of the hub;

a strip-securing means pivotably connected to the device so as to be pivotable about an axis spaced from the axis of the hub, the securing means including a. a strip-retaining arm spaced radially outwardly from the connection of the strip-securing means to the device, the retaining arm being positionable into, on the one hand, a strip-securing position wherein the arm extends in the general direction of the hub axis so as to be located proximate to and cover at least part of an outer convolution of a strip wound on the hub, thereby to substantially prevent unwinding of the strip from the device and, on the other hand, a strip-releasing position wherein the arm is removed from covering the strip by pivoting the arm about the connection; and b. a spindle-contacting portion spaced radially inwardly from the connection of the strip-securing means to the device, the spindle-contacting portion extending into the aperture when said arm is in the strip-securing position whereby upon movement of the spindle-contacting portion by the spindle the arm is pivoted from the strip-securing position to the strip-releasing position.

2. The invention according to claim 1 wherein the device is integrally formed of resilient plastic material.

3. The invention according to claim 1 wherein the device includes a radially extending flange connected to each end of the hub.

* * * * *